United States Patent
Heuver (10) Patent No.: US 8,016,576 B2
(45) Date of Patent: Sep. 13, 2011

(54) VEHICLE TRANSMISSION WITH FLUID PUMP HAVING A RECIRCULATION CIRCUIT

(75) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 12/185,079

(22) Filed: Aug. 2, 2008

(65) Prior Publication Data

US 2010/0028172 A1    Feb. 4, 2010

(51) Int. Cl.
*F04C 15/00* (2006.01)
*F04C 2/00* (2006.01)

(52) U.S. Cl. ............ 418/77; 418/79; 418/170; 418/171; 475/221

(58) Field of Classification Search ............ 418/75, 418/78–80, 166, 169–171; 475/220–221
See application file for complete search history.

(56) References Cited

U.S. PATENT DOCUMENTS

| 1,773,211 | A | * | 8/1930 | Wilsey .................... 418/170 |
| 2,823,616 | A | | 2/1958 | Toyoda |
| 2,997,960 | A | | 8/1961 | Kimijima et al. |
| 3,833,317 | A | | 9/1974 | Rumsey |
| 4,905,535 | A | * | 3/1990 | Ludwig et al. .................. 418/77 |
| 5,199,317 | A | * | 4/1993 | Moore et al. .................... 74/361 |
| 5,205,797 | A | * | 4/1993 | Kobayashi et al. ........... 475/221 |
| 6,227,833 | B1 | * | 5/2001 | Frøslev et al. ................. 418/170 |
| 6,824,486 | B2 | | 11/2004 | Maeno et al. |
| 7,037,085 | B1 | * | 5/2006 | Stark et al. ........................ 418/9 |
| 2004/0234393 | A1 | | 11/2004 | Kim |
| 2006/0067849 | A1 | | 3/2006 | Kimura et al. |

FOREIGN PATENT DOCUMENTS

WO    WO 98/25029    6/1998

* cited by examiner

*Primary Examiner* — Theresa Trieu
(74) *Attorney, Agent, or Firm* — Just Intellectuals, PLLC; Kristy J. Downing (57) ABSTRACT

The present disclosure relates to a vehicle transmission with fluid pump having a recirculation circuit. The recirculation circuit is configured to direct fluid from an outlet of the pump to an inlet during pump cycling. A method of manufacturing a fluid pump for use in a vehicle transmission is also disclosed.

11 Claims, 10 Drawing Sheets

VEHICLE TRANSMISSION WITH FLUID PUMP HAVING A RECIRCULATION CIRCUIT

TECHNICAL FIELD

The present disclosure relates to a vehicle transmission. More specifically, the present disclosure relates to an automatic transmission with fluid pump having a hydraulic circuit.

BACKGROUND

Conventional automobile transmissions include an oil pump to supply oil to various components within the transmissions. The oil pump can be driven by the engine and/or electric motors. Transmissions include an input shaft that can be coupled to the engine crankshaft. The oil pump can be indirectly driven by the engine through the transmission input shaft.

Rotary lobe pumps and gear pumps can be utilized with conventional automobile transmissions. The pumps include at least two engaging gears or rotors. As the gears engage fluid is pulled in and out of the pump cavity. During cycling the rotors may overheat causing axial or radial expansion and ultimately leading to seizure of the pump. Additionally, just after engine start up, settled debris on the bottom of the torque converter may flow between gears causing congestion between the moving parts. Such congestion can cause abrasive wear of the pump components and negatively impact the overall performance and durability of the pump.

Some pumps include seals to prevent fluid leakage into certain areas of the transmission. However, such seals require a number of additional assembly steps. Moreover, the cost of the seals increase the overall part costs of the pump.

Therefore, it is desirable to have a fluid pump with its own hydraulic circuit designed to reduce the temperature of the gears during operation. Moreover, it is desirable to have a lubricating system that reduces debris within the pump cavity. Also, a fluid pump of lower costs than existing pump designs is desired.

SUMMARY

In one exemplary embodiment, a vehicle transmission with fluid pump having a recirculation circuit comprises an input shaft configured to rotate and a pump housing mounted with respect to the input shaft. The pump housing defines an inlet and outlet. A drive gear journaled onto the input shaft is positioned inside the housing. A slave gear is positioned to engage the drive gear. Rotation of the drive gear and slave gear pulls fluid through the inlet and discharges fluid from the outlet. The drive gear includes a recirculation circuit configured to direct fluid from the outlet of the pump to the inlet during pump cycling.

According to another exemplary embodiment, a fluid pump for use in a vehicle transmission comprises a pump housing defining an inlet and outlet; a drive gear positioned inside the housing; and a slave gear positioned to engage the drive gear. Rotation of the gears pulls fluid through the inlet and discharges fluid from the outlet. The drive gear includes a recirculation circuit configured to direct fluid from the outlet of the pump to the inlet of the pump during pump cycling.

A method of manufacturing a fluid pump for use in a vehicle transmission includes: forming a pump housing; forming a first gear; and forming a second gear. The process of forming the second gear includes providing a first section of the die having a profile to create a hydraulic circuit in the second gear. The hydraulic circuit is configured to redirect fluid from an outlet portion of the pump to an inlet portion. The process of forming the second gear further includes providing a second section of the die and solidifying material in the first and second sections of the die to form the second gear.

An advantage of some the techniques provided in the present disclosure is that they reduce contamination at the inlet of the fluid pump.

Another advantage of some of the techniques provided in the present disclosure is that they reduce the temperature of the drive gear.

The above features and advantages and other features and advantages of the present invention are readily apparent from the following detailed description of the best modes for carrying out the invention when taken in connection with the accompanying drawings.

DETAILED DESCRIPTION

Figure 1:
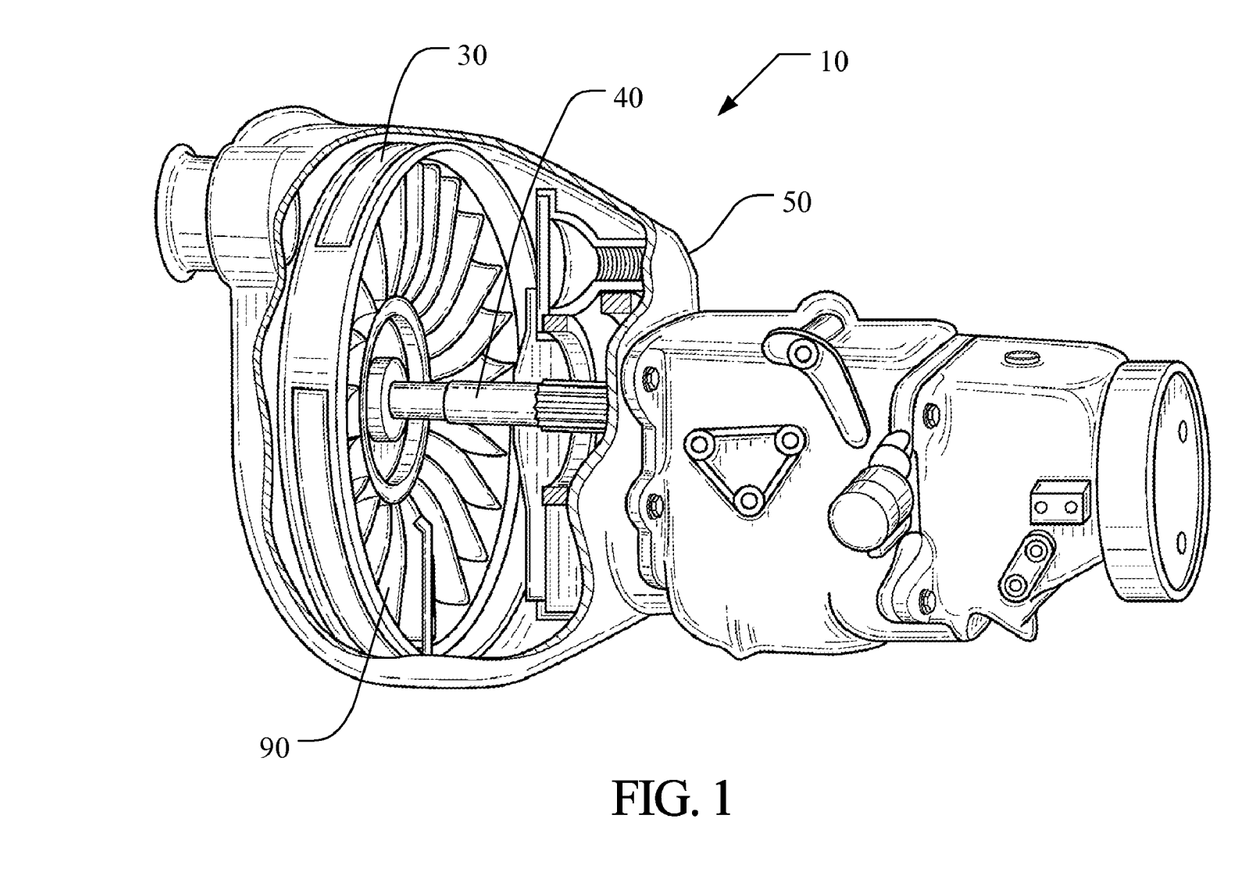
FIG. 1 is a perspective view of a vehicle transmission according to an exemplary embodiment.

Referring to the drawings, FIGS. 1 through 11, wherein like characters represent the same or corresponding parts throughout the several views there is shown a vehicle transmission with fluid pump. Specifically, with reference to FIG. 1 a vehicle transmission 10 is shown attached to an engine (not shown). The transmission is an automatic transmission and includes a torque converter 30. The torque converter 30 is journaled onto (or rotatably mounted with respect to) the transmission input shaft 40 which is also at least partially covered by the transmission housing 50. While the transmission 10 shown in FIG. 1 is an automatic transmission the techniques included in the present disclosure may be used with a manual transmission, continuously variable transmission and/or any electrically variable transmission for use in hybrid or electric vehicles.

Figure 2:
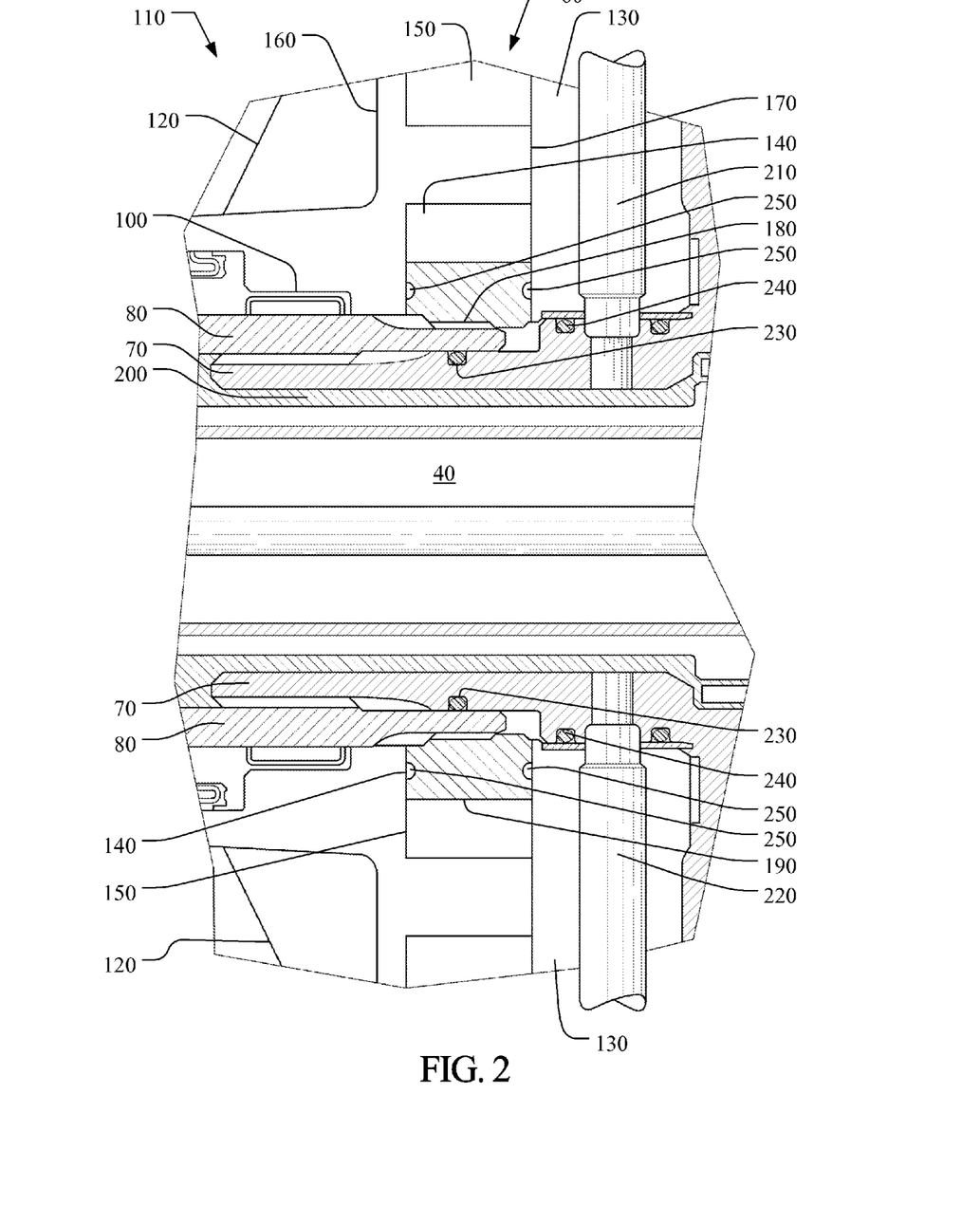
FIG. 2 is a cross-sectional view of a portion of a transmission according to an exemplary embodiment.

As shown in FIG. 2, additional transmission components are at least partially contained in the transmission housing including the fluid pump 60, power take-off gear (or "PTO") 70, and impeller hub 80 of the torque converter. In the exemplary embodiment of FIG. 2, a power take-off gear 70 is rotatably mounted with respect to the input shaft 40. The power take-off gear 70 is configured to rotate with the engine crankshaft (not shown) and input shaft 40. The PTO 70 enables other vehicle equipment to run off of the rotational energy provided by the engine. Such auxiliary equipment may include a lift, automatic tail gate actuator, hydraulic pump, winch, etc. In one embodiment, the transmission is a "live drive" transmission and the PTO remains operational regardless of whether the vehicle is in motion. The torque converter 30 (as shown in FIG. 1) includes the impeller hub 80 that at least partially houses the impellers 90 (as also shown in FIG. 1) of the torque converter 30. The PTO 70 partially nests inside of the distal end of the impeller hub 80 as shown in FIG. 2.

The fluid pump 60 is journaled onto the input shaft 40, as also shown in FIG. 2. The fluid pump 60 is at least partially supported by a bearing 100 that sits between the impeller hub 80 and a front cover of the fluid pump housing 110. In this embodiment, the pump housing 110 consists of a front cover 120 and a back cover 130. The covers 120, 130 enclose a drive gear 140 and a slave gear (or driven gear) 150 in a flat plate arrangement. A clearance (or axial gap) is provided between the gears 140, 150 and the inner sides 160, 170 of the front cover 120 and back cover 130, respectively. Rotation of the drive gear 140 and slave gear 150 pulls fluid through an inlet of the pump (as shown and discussed with respect to FIG. 4) and discharges fluid from an outlet of the pump along the axial clearance between the gears 140, 150 and the covers 120, 130 of the pump housing 110.

The drive gear 140, as shown in FIG. 2, is configured to engage the impeller hub 80, as shown at 180. The rotation of the impeller hub 80 rotates the drive gear 140. The slave gear 150 engages the drive gear 140 as shown, e.g. at 190. In this manner, the fluid pump 60 serves as the primary pump for the transmission and selectively directs fluid to various components of the transmission. For example, the pump directs fluid (e.g., oil or lubricant) from the input shaft 40 to supply fluid to the torque converter 30. The torque converter 30 exhausts fluid through the PTO 70 and input shaft 40 through channel 200. Fluid axially passes the fluid pump 60 and continues through channels 210 and 220, which are in the back cover 130 of the pump housing 110. The fluid exiting the torque converter may reach temperatures as high as 175 degrees Celsius. In the illustrated embodiment of FIG. 2, seals 230 and 240 are provided. Seal 230 restricts leakage from the impeller hub 80 into the pump cavity. Seal 240 restricts fluid flow from the torque converter exhaust through the back cover 130 of the pump housing 110.

In the exemplary embodiments of FIGS. 2-7 and 9-10, the gears (or rotors) of the fluid pump are shown. In FIG. 2, the drive gear 140 includes a recirculation circuit 250 on two sides of the drive gear. The recirculation circuit 250 is a hydraulic circuit configured to redirect oil from an inlet section of the pump to an outlet section of the pump 60. In the exemplary embodiments of FIGS. 2-7 and 9, the recirculation circuit is an annular groove (or channel) that axially extends inside a side of the gear. In another embodiment only one side of the gear includes a recirculation circuit. In another alternative embodiment, the slave gear 150 includes a recirculation circuit.

Figure 3:
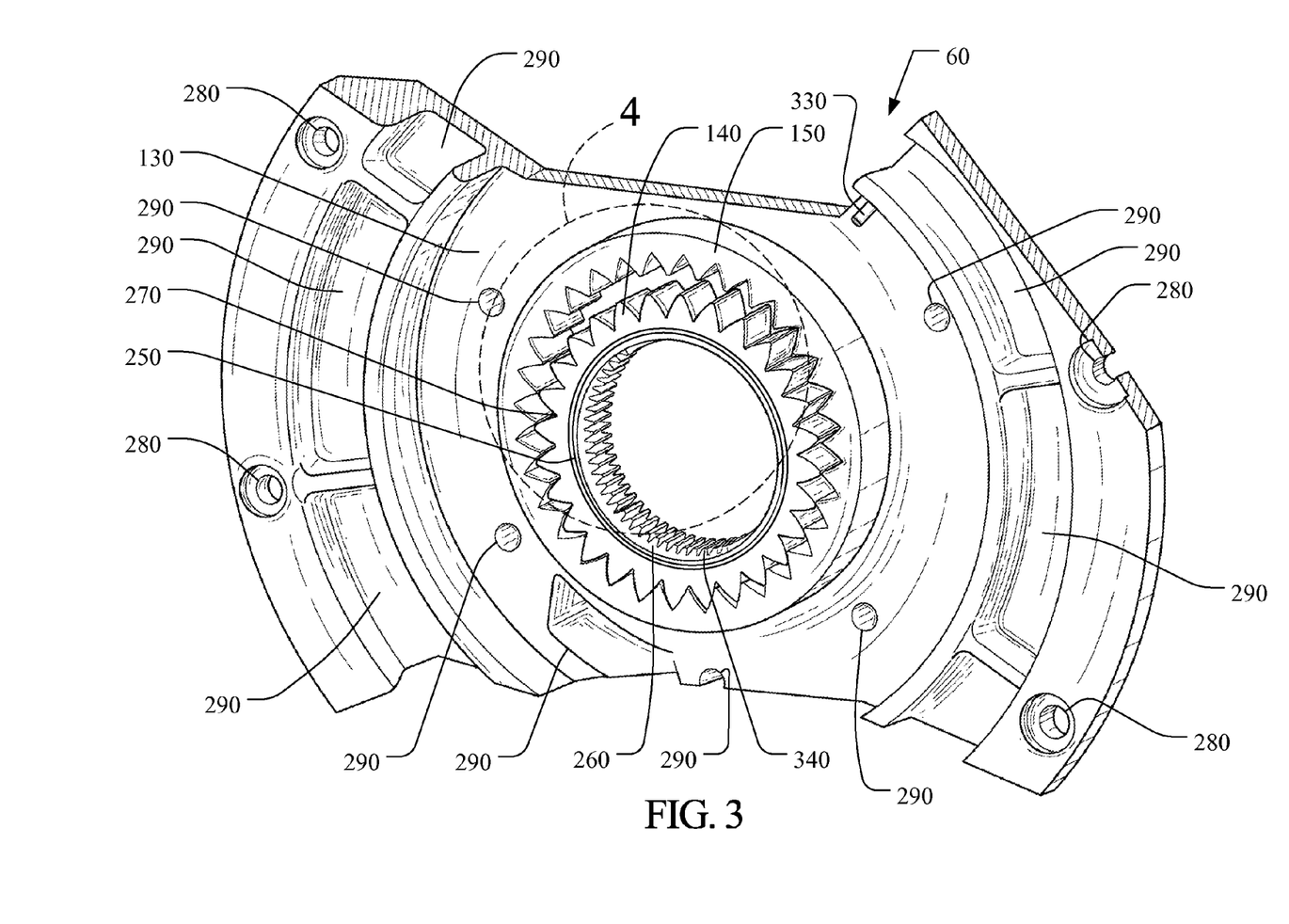
FIG. 3 is a perspective view of a fluid pump according to an exemplary embodiment.

With reference to FIG. 3, the gears 140 and 150 of the fluid pump 60 are shown mounted with respect to the back cover 130 of the pump housing. The drive gear 140 is nestably mounted with respect to the slave gear 150. The drive gear 140 includes a recirculation circuit 250 that comprises an annular groove on its face. The annular groove is shown relatively proximate to the inner diameter 260 of the gear. In an alternative embodiment, the annular groove is more distal with respect to the inner diameter of the gear. The recirculation circuit can abut the base diameter of the gear 270. The back cover of the pump housing includes a series of orifices 280 to attach the cover to other components in the transmission (e.g., the front cover of the pump housing). The back cover also includes several recesses 290 that reduce the material costs of the pump, reduce weight and enhance overall pump performance.

Figure 4:
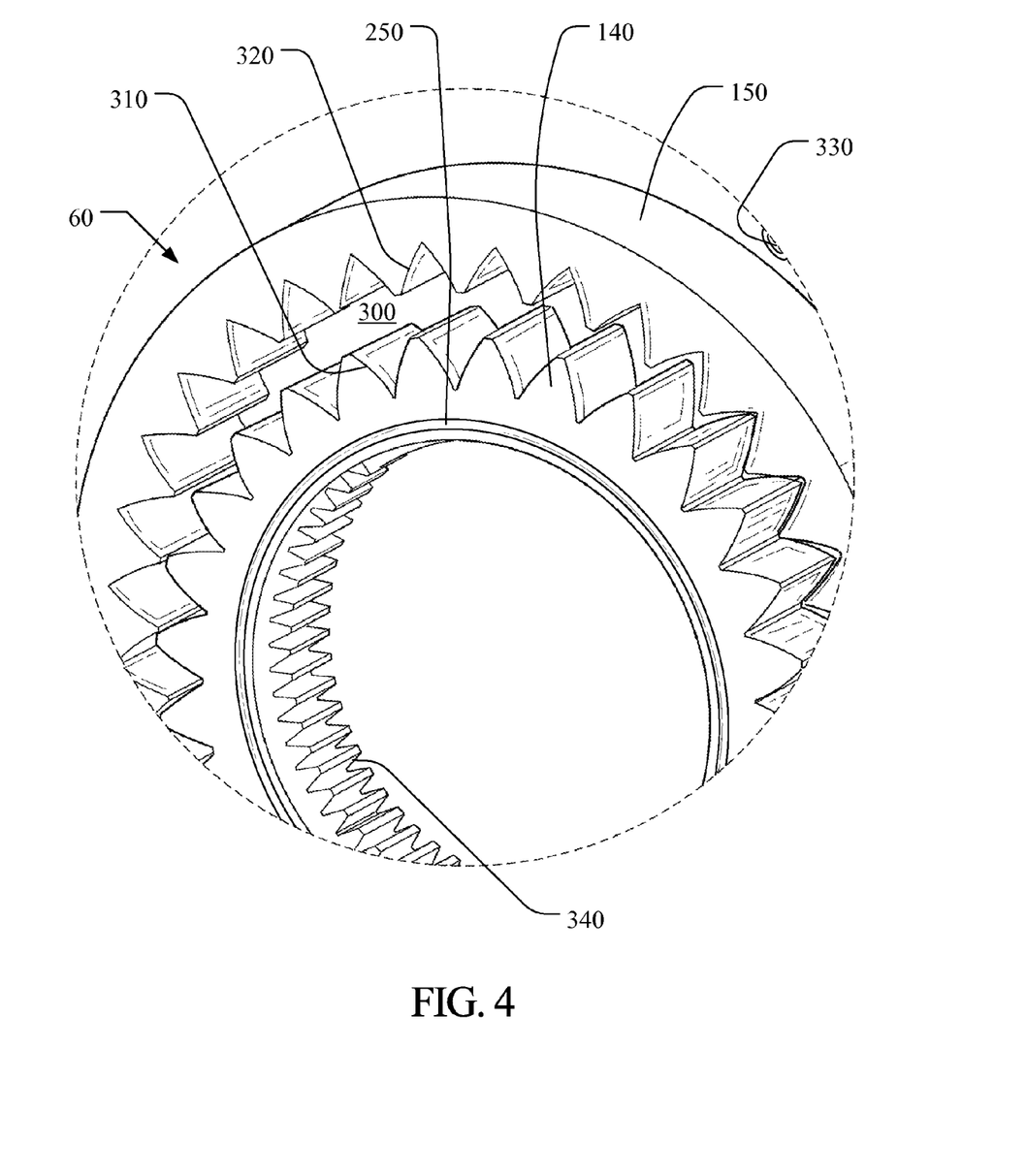
FIG. 4 is a perspective view of an inlet of the fluid pump of FIG. 3.

Referring now to FIG. 4, the fluid pump 60 of FIG. 3 is shown therein. The fluid pump 60 defines an inlet 300 where the teeth 310, 320 of the drive gear 140 and slave gear 150, respectively are disengaged. The disengagement of the gears 140, 150 causes fluid to be pulled into the inlet 300 of the pump 60. A channel or nozzle 330 is provided in the back cover 130 to guide fluid from one side of the pump cover into the inlet 300 of the pump. The drive gear includes a series of splines 340 that enable the drive gear to attach to the impeller hub 80 (as shown in FIG. 2).

Figure 5:
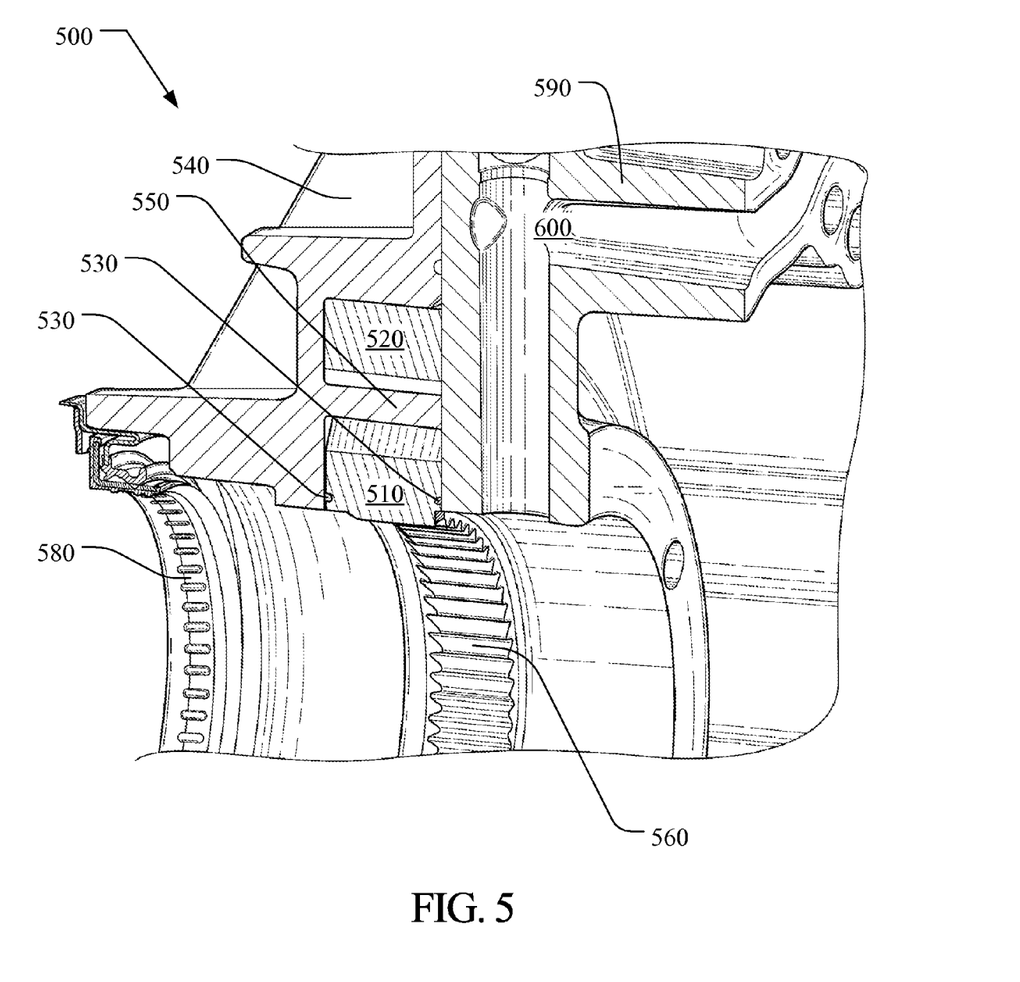
FIG. 5 is a cross-sectional perspective view of a fluid pump accordingly to an exemplary embodiment.

With reference to FIG. 5, another exemplary embodiment of a fluid pump 500 is shown. FIG. 5 is a cross-sectional view of the fluid pump 500 with impeller hub 80, PTO 70 and input shaft 40 (as shown in FIG. 2) cut away. The drive gear 510 is shown nestably mounted inside of the slave gear 520. The drive gear 510, shown in FIG. 5, includes two recirculation circuits 530 configured as annular grooves. The pump front cover 540 includes a crescent shaped wedge 550 that assists in displacing fluid between the drive gear 510 and slave gear 520. The drive gear 510 also includes a series of splines 560 at its inner circumference for engaging the impeller hub 80 (as shown in FIG. 2) which drives the drive gear 510. The front cover 540 rests on a seal 580 placed inside of the pump front cover 540 and the impeller hub. The impeller hub seal 580 restricts fluid from passing out of the transmission. The back cover 590 of the pump housing includes a channel 600 through which fluid from the torque converter may be discharged.

Figure 6:
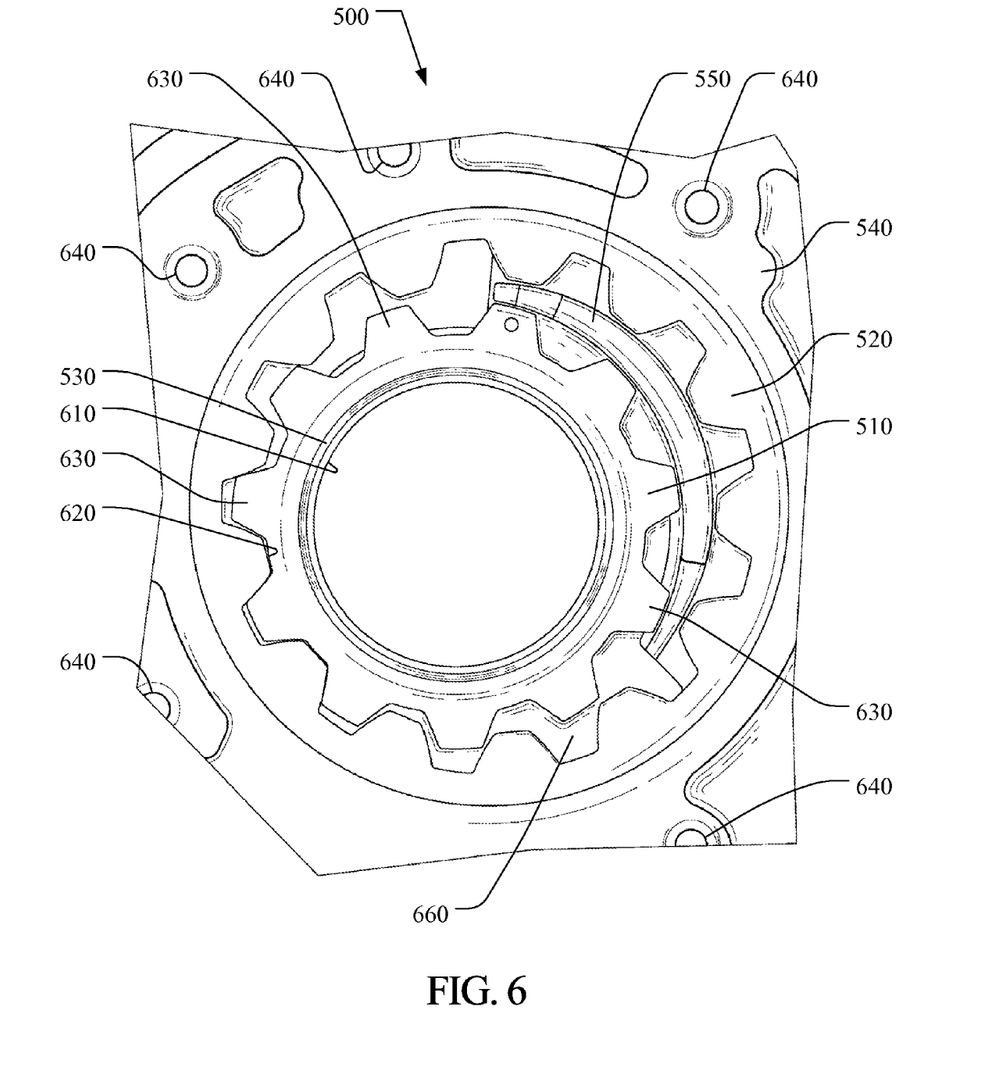
FIG. 6 is side view of the gear pump of FIG. 5.

A front view of a fluid pump of FIG. 5 is shown in FIG. 6. The fluid pump 500 is a gear pump. The drive gear 510 and slave gear 520 are rotatably mounted with respect to the input shaft 40 (as shown in FIG. 2). The drive gear 510 is nested inside of the slave gear 520 and the two are configured to meshingly engage as shown in FIG. 6. The gears 510, 520 are axially mounted with respect to the input shaft. With further reference to FIG. 6, the recirculation circuit 530 is integral with the drive gear 510 and proximate the inner circumference 610 of the gear. The recirculation circuit 530 is positioned between the inner circumference 610 of the gear and the base diameter 620 of the gear teeth 630. The diameter of the recirculation circuit is smaller than the base diameter 620 of the gear. The wedge 550 is positioned between the drive gear 510 and the slave gear 520. The wedge 550 is fixed with respect to the front cover 540 of the housing. The front cover 540 includes a number of orifices 640 used to attach the front and back covers 540, 590 of the pump housing.

Figure 7:
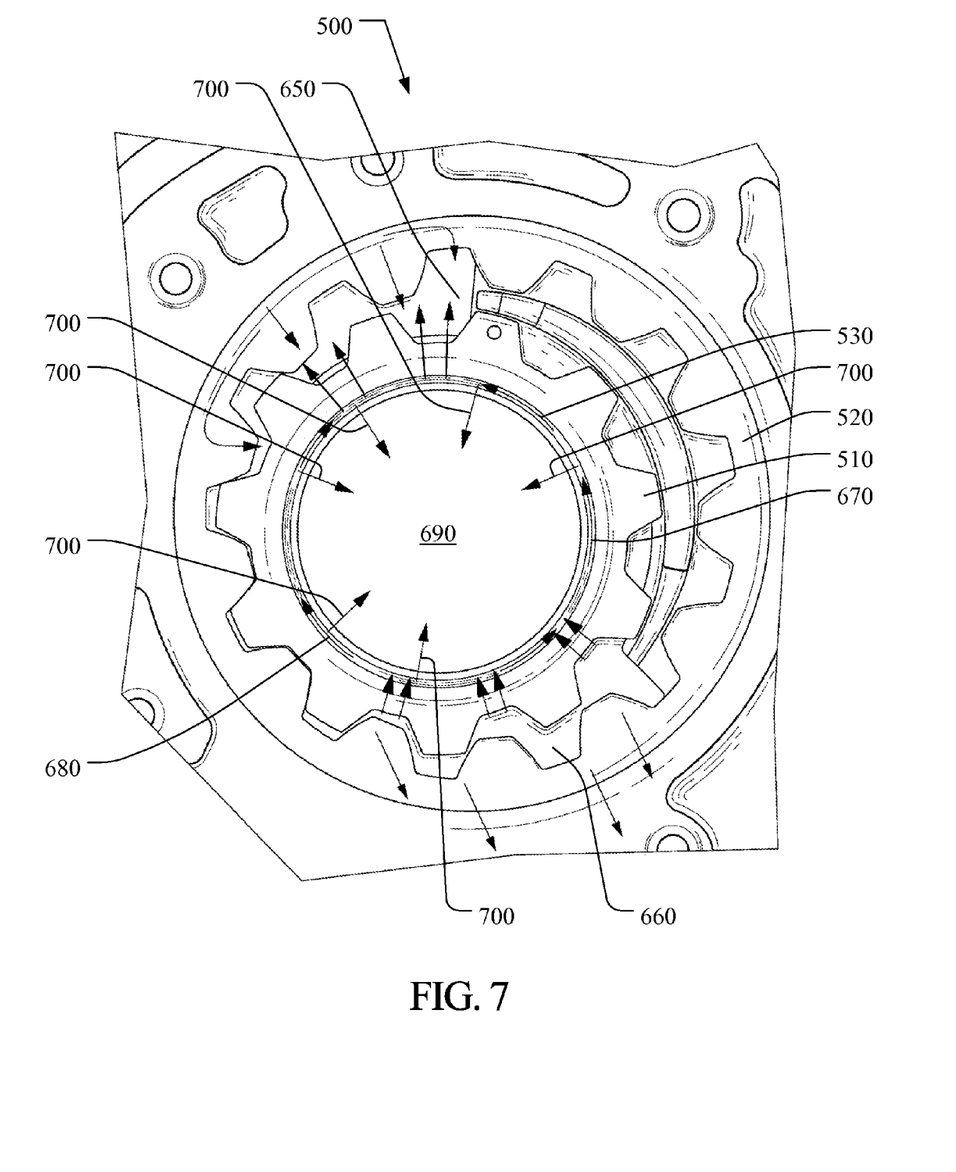
FIG. 7 is side view of the gear pump of FIG. 5 with lubrication flow diagram therein.

With reference to FIG. 7, a fluid flow diagram is shown with respect to the gear pump 500 of FIG. 6. During pump cycling fluid is guided between the drive gear 510 and slave gear 520 at the pump inlet 650. Fluid is guided away from the pump outlet 660. The recirculation circuit 530 enables fluid to be redirected from the outlet 660 of the pump to the inlet 650. As shown in FIG. 7, fluid is guided along the channel of the recirculation circuit 530 as shown at 670 and 680. In the illustrated embodiment, fluid travels in the channel in both the clockwise and counter-clockwise directions. At the pump outlet 660 the pressure is greater than the pressure in the recirculation circuit, accordingly fluid is guided into the recirculation circuit 530. The pump inlet pressure 650 is lower than the pressure at the recirculation circuit 530 and fluid is thereby inclined to travel toward the inlet of the pump. The pressure towards the center section of the drive gear at 690 is also less than the pressure in the recirculation circuit 530, accordingly fluid is directed from the recirculation circuit towards the center section of the drive gear, as shown at 700. In this manner excessively hot fluid and debris that would ordinarily leak from the torque converter exhaust in the impeller hub 80 (as shown in FIG. 2) is guided away from the drive gear 510. The overall temperature (or thermal energy) of the drive gear thereby decreases.

Figure 8:
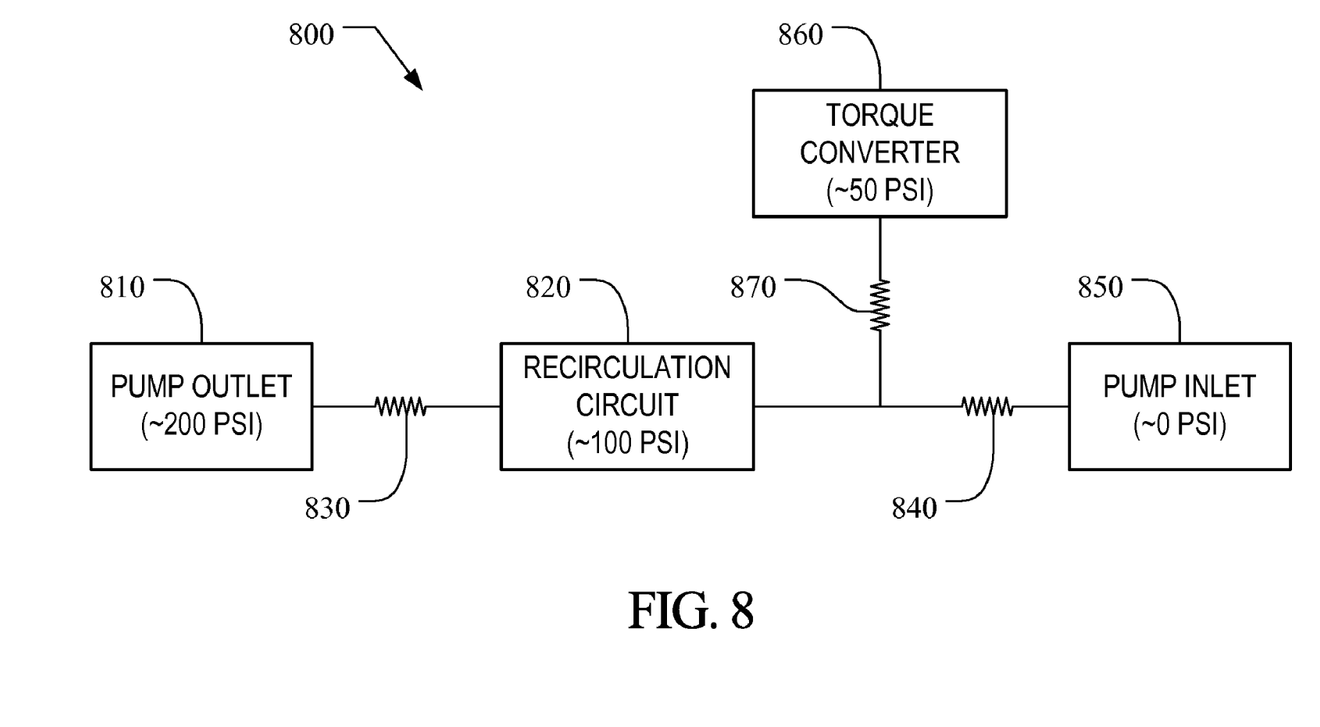
FIG. 8 is a schematic diagram of the pressure variation across a side of a drive gear according to an exemplary embodiment.

FIG. 8 is a schematic diagram of the pressure variation 800 across a side of a drive gear in a fluid pump. FIG. 8 further demonstrates the pressure differentials in the fluid pump as well as the resistance to flow therein. In the example of FIG. 8, the pump outlet 810 is at a pressure of 200 psi thus enabling the pump to direct fluid away from the pump housing and to various components within the transmission. Between the pump outlet and the recirculation circuit 820 there exists a resistance 830 to flow that is in part due to the dimensional clearance between the gears and covers of the pump housing (as shown and discussed, for example, with respect to FIG. 2). The pressure at the recirculation circuit 820 is 100 psi in the example of FIG. 8. There further exists some resistance 840 to flow between the recirculation circuit 820 and the pump inlet 850. The pressure at the pump inlet 850 is zero psi. Where the resistance 840 is less than the pressure at the inlet, the fluid will be directed away from the recirculation circuit to the inlet 850. The pressure at the center section of the pump 860 where the torque converter exhaust flows is approximately at 50 psi. Since the pressure at the recirculation circuit 820 is greater than the pressure at the center section of the pump 860 fluid is also guided from the recirculation circuit towards the center section of the pump. A resistance 870 is also between the recirculation circuit 820 and the center section of the pump 860. The pressure in the recirculation circuit 820 is greater than the pressure at the center section of the pump 860 and the resistance 870 between the recirculation circuit and center section of the pump. The resistance in the fluid pump may be variable. For example the circumference of the recirculation circuit may be enlarged so as to reduce the resistance between the outlet and inlet. Additionally, the clearance between the gears and the pump housing covers may be further adjusted to alter the overall resistance between the pump inlet and outlet.

Figure 9:
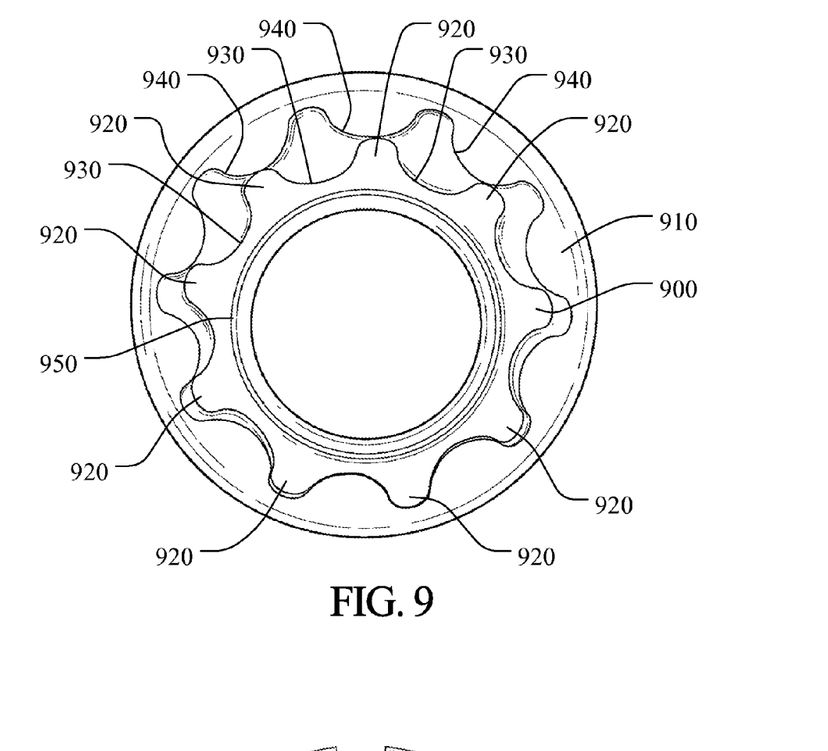
FIG. 9 is side view of a gerotor pump according to an exemplary embodiment.

With reference to FIG. 9, gears for a gerator (or "g-rotor") fluid pump are shown. The g-rotor pump includes gears 900, 910. The drive gear 900 includes a number of lobes 920 in the place of the gear teeth. Between the lobes are opposing wedges (or crescents) 930 and 940 that assist in the displacement of fluid between the drive gear 900 and slave gear 910. Accordingly, the wedge 550, as shown in FIG. 5 for example, is not needed. The drive gear 900 includes a recirculation circuit 950 that comprises an annular channel of the front face of the gear.

Figure 10:
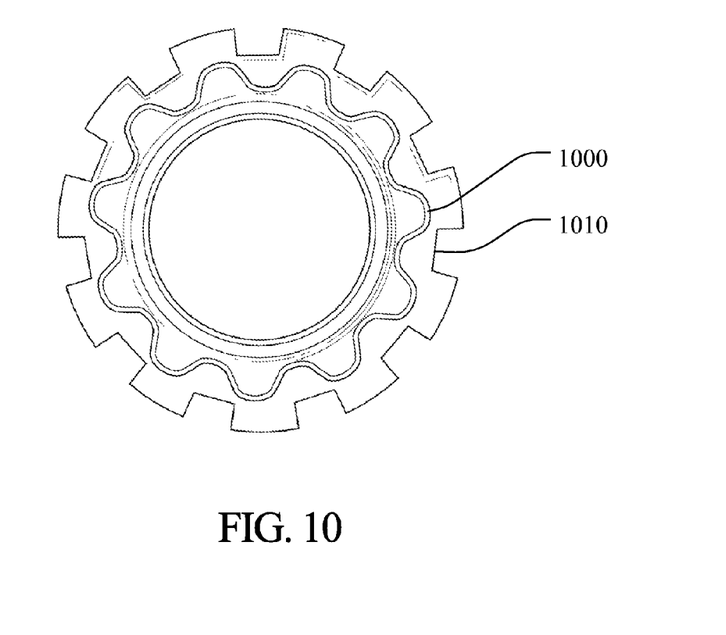
FIG. 10 is side view of a gear pump according to an exemplary embodiment.

With reference to FIG. 10, an exemplary embodiment shows a recirculation circuit 1000 with variable radius. The recirculation circuit 1000 of FIG. 10 includes a channel having a wavy profile on the face of the gear 1010. The distance between the pump inlet/outlet and the recirculation circuit varies. In this manner the resistance between the pump inlet/outlet and the recirculation circuit varies and can be reduced at the outermost circumference of the recirculation circuit. The design of the recirculation circuit is not limited to the embodiments shown in the present disclosure. For example, in the illustrated embodiment of FIG. 10, the recirculation circuit 1000 is shown as a continuous channel; however in another embodiment the recirculation circuit can include disconnected elements such as vanes, recesses, semi-circular grooves, etc. Additionally, in one embodiment, the resistance to flow in the pump can be adjusted by altering the clearance between the front cover and the back cover of the pump housing. The clearance between the covers and the gears is inversely related to the resistance in the pump. Therefore, increasing the clearance reduces the resistance in the fluid pump; likewise reducing the clearance between the covers and the gears increases the resistance in the pump.

The width of the recirculation circuit can be at least 0.5 millimeters. In another embodiment, the depth of the recirculation circuit is at least 0.5 mm. The depth and width of the groove can be constant or varied. Additionally, the recirculation circuit can include a groove with a depth or width that is greater than or less than 0.5 mm. For example, in one embodiment, the recirculation circuit includes a protrusion on the surface of the gear face. In another embodiment, the recirculation circuit can be included on the gear teeth/lobes, between the teeth/lobes, on the pump covers, the impeller hub and/or any other elements inside the pump housing.

In another exemplary embodiment, the fluid pump is an off-axis pump. The drive gear is not nested inside of the slave gear. For example, the axes of rotation of the drive and slave gears are in parallel. In another arrangement the axes of rotation may be perpendicular or otherwise intersecting.

The components of the fluid pump may be composed of various materials known within the art. For example, in one embodiment the pump front cover is composed of Fe. The drive gear is composed of an Fe-alloy such as steel and the slave gear is composed of an aluminum alloy. The rear pump cover is also composed of an aluminum alloy.

Figure 11:
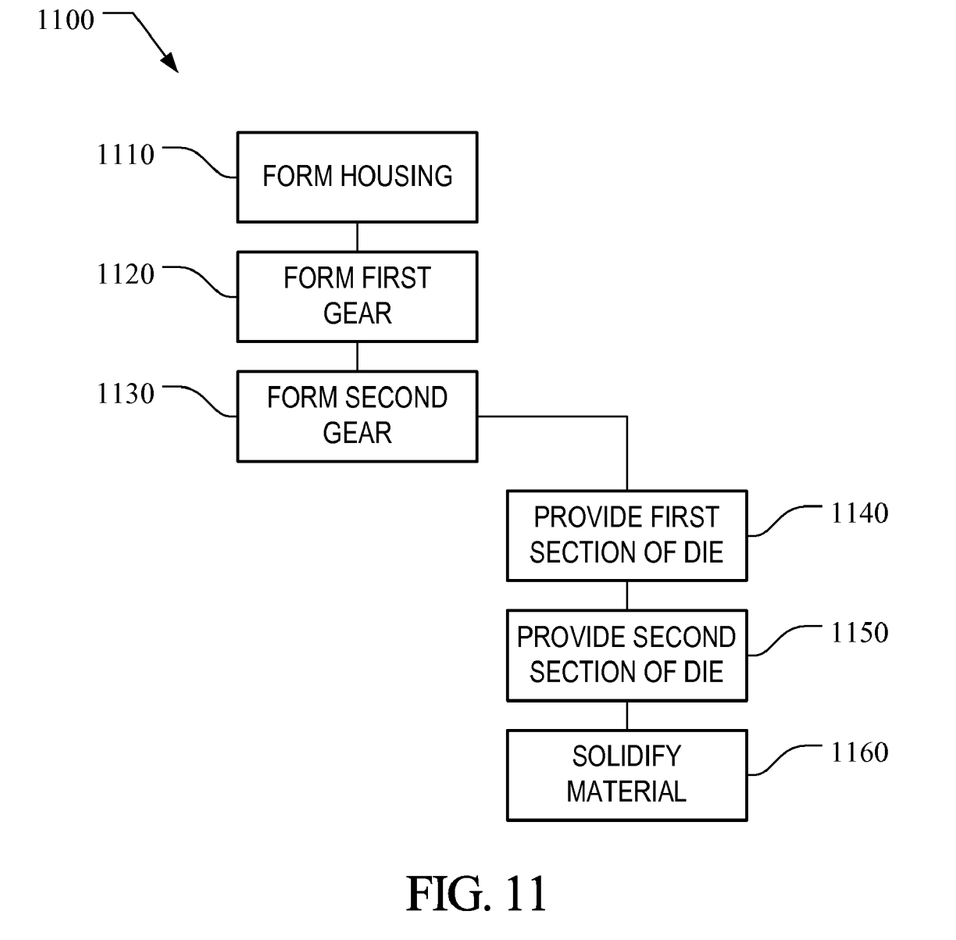
FIG. 11 is a block diagram showing a method of manufacturing a fluid pump according to an exemplary embodiment.

With reference to FIG. 11, a method 1100 of manufacturing a fluid pump is disclosed. The method includes the steps of forming a pump housing 1110; forming a first gear 1120; and forming a second gear 1130. The forming process may include any number of conventional forming procedures such as powder metallurgy, milling, laser cutting, die casting, forging or stamping. The process of forming the second gear further includes providing a first section of the die having a profile to create a hydraulic circuit in the second gear 1140. The profile is configured such that the hydraulic circuit of the second gear can redirect fluid from an outlet portion of the pump to an inlet portion. Exemplary hydraulic circuits are illustrated in the recirculation circuits of FIGS. 2-7 and 9-10. The method also includes providing a second section of the die 1150 and solidifying a material in the first and second sections of the die to form the second gear 1160. The gears can also be formed using other manufacturing techniques such as cutting, stamping, etc.

In one embodiment, the drive and slave gears are formed using powder metallurgy. A powdered material is provided in a first and second die/mold. The material is then sintered (or heat treated) and pressurized into solidification. The powdered material can be composed of any high strength alloy such as, e.g., aluminum or Fe alloys.

The method can also include the step of arranging the first gear and second gear inside the pump housing so that the second gear nests inside of the first gear. Exemplary first and second gears are illustrated in FIGS. 2-7 and 9-10 of the present disclosure.

While certain embodiments of the present techniques have been described in detail, those familiar with the art to which this invention relates will recognize various alternative designs and embodiments for practicing the invention as defined by the following claims. Additionally, while the best modes for carrying out the invention have been described in detail, those familiar with the art to which this invention relates will recognize various alternative designs and embodiments for practicing the invention within the scope of the appended claims.

I claim:

1. A vehicle transmission with fluid pump comprising:
   an input shaft;
   a pump housing having an inlet and an outlet, and mounted to the input shaft;
   a drive gear journaled onto the input shaft within the pump housing;
   a slave gear meshingly engaging the drive gear to cooperatively pump fluid from the inlet to the outlet;
   a recirculation circuit integral with the drive gear configured to direct fluid from the outlet of the pump to the inlet during pump cycling; and
   a torque converter coupled to the input shaft, wherein the torque converter is in fluid communication with the outlet of the fluid pump and wherein the torque converter exhausts fluid through a hub between the drive gear and input shaft;
   wherein the recirculation circuit at least partially prevents fluid flow from the hub to the inlet.

2. The transmission of claim 1, wherein the recirculation circuit is configured to direct fluid into the hub in a direction away from the inlet of the pump.

3. The transmission of claim 1, wherein the recirculation circuit is configured to increase pressure in the inlet of the pump during pump cycling, thereby enabling fluid to flow from the inlet towards the input shaft.

4. The transmission of claim 1, wherein the recirculation circuit is configured to reduce resistance between the hub and inlet during pump cycling, thereby enabling fluid to flow from the inlet towards the hub.

5. The transmission of claim 1, wherein the drive and slave gears are rotatably mounted with respect to the hub of the transmission and wherein the slave gear is journaled onto the drive gear.

6. The transmission of claim 1, wherein the recirculation circuit is configured to reduce thermal energy in the drive gear during cycling.

7. The transmission of claim 1, wherein the recirculation circuit comprises an annular groove on at least one side of the drive gear.

8. The transmission of claim 7, wherein the recirculation circuit comprises an annular groove on at least two sides of the drive gear.

9. The transmission of claim 1, wherein the recirculation circuit comprises a groove on at least one side of the drive gear, wherein the position of the groove varies with respect to the radius of the drive gear.

10. The transmission of claim 1, wherein the fluid pump is a gear pump and the drive and slave gears having gear teeth circumferentially dispersed.

11. The transmission of claim 1, wherein the fluid pump is a gerotor pump and the drive and slave gears having lobes circumferentially dispersed.

* * * * *